US012550003B2

(12) United States Patent
Kotaru et al.

(10) Patent No.: US 12,550,003 B2
(45) Date of Patent: Feb. 10, 2026

(54) REPURPOSING MOBILITY MANAGEMENT WITH VIRTUAL RADIO IN SOFTWARE RADIO ACCESS NETWORKS

(71) Applicant: Microsoft Technology Licensing, LLC, Redmond, WA (US)

(72) Inventors: Manikanta Kotaru, Kenmore, WA (US); Paramvir Bahl, Bellevue, WA (US); Daehyeok Kim, Redmond, WA (US); Xenofon Foukas, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 689 days.

(21) Appl. No.: 17/841,325

(22) Filed: Jun. 15, 2022

(65) Prior Publication Data
US 2023/0413111 A1 Dec. 21, 2023

(51) Int. Cl.
*H04W 28/08* (2023.01)
*H04W 28/086* (2023.01)
*H04W 36/08* (2009.01)

(52) U.S. Cl.
CPC ... *H04W 28/0831* (2020.05); *H04W 28/0858* (2020.05); *H04W 28/086* (2023.05); *H04W 36/08* (2013.01)

(58) Field of Classification Search
CPC ......... H04W 28/0831; H04W 28/0858; H04W 28/086; H04W 36/08; H04W 24/02; H04W 36/22; H04W 88/085
See application file for complete search history.

(56) References Cited

U.S. PATENT DOCUMENTS

| 2016/0029205 | A1 | 1/2016 | Sirotkin | |
| 2017/0318516 | A1* | 11/2017 | Huang | H04W 36/20 |
| 2017/0353903 | A1* | 12/2017 | Rost | H04W 36/22 |

(Continued)

FOREIGN PATENT DOCUMENTS

WO 2021242153 A1 12/2021

OTHER PUBLICATIONS

"Network Functions Virtualisation (NFV) Release 5; Architectural Framework; Report on NFV support for virtualization of RAN", In ETSI Draft Specification, ETSI GR NFV-IFA 046, Jun. 13, 2022, 58 Pages.

(Continued)

*Primary Examiner* — Charles C Jiang
*Assistant Examiner* — Rachel Elizabeth Marks
(74) *Attorney, Agent, or Firm* — ArentFox Schiff LLP

(57) ABSTRACT

Described are examples for repurposing mobility management with virtual radio in software radio access networks. A virtual mobile network includes a first server configured to host a first mobile network distributed unit (DU) for providing a first virtual cell to a plurality of user devices via a radio unit. The virtual mobile network also includes a second server configured to host a second mobile network distributed unit providing a second virtual cell via the same radio unit. A radio access network (RAN) intelligent controller (RIC) is configured to control the first DU and the second DU to hand over the plurality of user devices from the first virtual cell to the second virtual cell. The first server may then be shut down for maintenance or updates without dropping service to the user devices.

18 Claims, 7 Drawing Sheets

(56) References Cited

U.S. PATENT DOCUMENTS

2018/0139655 A1    5/2018   Hsu et al.
2018/0376380 A1*  12/2018   Leroux .................. H04W 4/70
2023/0300701 A1*   9/2023   Wang .................... H04W 36/14
                                                    455/436
2024/0305533 A1*   9/2024   Bai ...................... H04W 24/02
2024/0334200 A1*  10/2024   Jamadagni ............ H04W 24/02

OTHER PUBLICATIONS

"International Search Report and Written Opinion Issued in PCT Application No. PCT/US2023/021789", Mailed Date: Aug. 24, 2023, 13 Pages.

* cited by examiner

REPURPOSING MOBILITY MANAGEMENT WITH VIRTUAL RADIO IN SOFTWARE RADIO ACCESS NETWORKS

BACKGROUND

A radio access network (RAN) may provide multiple user devices with wireless access to a network. The user devices may wirelessly communicate with a base station, which forwards the communications towards a core network. Conventionally, a base station in the RAN is implemented by dedicated processing hardware (e.g., an embedded system) located close to a radio unit including antennas. The base station may perform lower layer processing including physical (PHY) layer and media access control (MAC) layer processing for one or more cells. There may be costs associated with deploying dedicated processing hardware for each base station in a RAN, particularly for a RAN including small cells with relatively small coverage areas. Additionally, the dedicated processing hardware may be a single point of failure for the cell.

A virtualized radio access network may utilize one or more data centers with generic computing resources for performing RAN processing for one or more cells. That is, instead of performing PHY and MAC layer processing locally on dedicated hardware, a virtualized radio access network may forward radio signals from the radio units to the edge data center for processing and similarly forward signals from the edge data center to the radio units for wireless transmission. In one specific example, cloud-computing environments can be used to provide mobile edge computing (MEC) where certain functions of a mobile network can be provided as workloads on nodes in the cloud-computing environment. In MEC, a centralized unit (CU) can be implemented in a back-end node, one or more distributed units (DUs) can be implemented in intermediate nodes, and various radio units (RU) can be deployed at edge servers with connections to antennas. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc.

Because the data centers utilize generic computing resources, a virtualized RAN may provide scalability and fault tolerance for base station processing. For example, the data centers may assign a variable number of computing resources (e.g., servers) to perform processing for the radio units associated with edge data center based on a workload. Further, a virtualized RAN may implement multiple layers of RAN processing at a data center, enabling collection of multiple data feeds.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to a virtual mobile network including: a radio unit; a first server configured to host a first mobile network distributed unit (DU) for providing a first virtual cell to a plurality of user devices via the radio unit; a second server configured to host a second mobile network distributed unit providing a second virtual cell via the radio unit; and a radio access network (RAN) intelligent controller (RIC) configured to control the first DU and the second DU to hand over the plurality of user devices from the first virtual cell to the second virtual cell.

In some aspects, the techniques described herein relate to a virtual mobile network, wherein the RIC is configured to control the first DU and the second DU to perform an inter-gNB-DU handover for each of the plurality of user devices when the first mobile network DU is not co-located with a mobile network central unit.

In some aspects, the techniques described herein relate to a virtual mobile network, wherein the RIC is configured to control the first DU and the second DU to perform a handover via an Access and Mobility Management Function (AMF) for each of the plurality of user devices when the first mobile network DU is co-located with a mobile network central unit (CU).

In some aspects, the techniques described herein relate to a virtual mobile network, further including a hypervisor configured to combine in-phase and quadrature (IQ) samples from the first mobile network DU and the second mobile network DU for the radio unit.

In some aspects, the techniques described herein relate to a virtual mobile network, wherein the RIC is configured to shut down the first server when no user devices are connected to the first virtual cell.

In some aspects, the techniques described herein relate to a virtual mobile network, wherein the RIC is configured to initialize the second virtual cell on the second server prior to controlling the first DU and the second DU to hand over the plurality of user devices.

In some aspects, the techniques described herein relate to a virtual mobile network, wherein the first virtual cell and the second virtual cell have a same carrier frequency and are assigned different frequency domain resources.

In some aspects, the techniques described herein relate to a virtual mobile network, wherein the first virtual cell and the second virtual cell are configured with a same transmission power.

In some aspects, the techniques described herein relate to a virtual mobile network, wherein the RIC is configured to control the first DU and the second DU to hand over the plurality of user devices based on load balancing between the first server and the second server.

In some aspects, the techniques described herein relate to a virtual mobile network, wherein the first server is configured to host a first central unit, wherein the RIC is configured to control the first DU to hand over one or more of the user devices to a third virtual cell provided by a third DU on the first server and supported by a second central unit on the second server.

In some aspects, the techniques described herein relate to a method, including: determining to reduce a load on a first server hosting a first mobile network distributed unit (DU) for providing a first virtual cell to a plurality of user devices via a radio unit; identifying a second server hosting a second mobile network DU providing a second virtual cell via the radio unit; and handing over the plurality of user devices from the first virtual cell to the second virtual cell.

In some aspects, the techniques described herein relate to a method, wherein handing over the plurality of user devices includes performing an inter-gNB-DU handover for each of the plurality of user devices when the first mobile network DU is not co-located with a mobile network central unit.

In some aspects, the techniques described herein relate to a method, wherein handing over the plurality of user devices includes performing a handover via an Access and Mobility Management Function (AMF) for each of the plurality of user devices when the first mobile network distributed unit is co-located with a mobile network central unit.

In some aspects, the techniques described herein relate to a method, further including combining in-phase and quadrature (IQ) samples from the first mobile network DU and the second mobile network DU for the radio unit.

In some aspects, the techniques described herein relate to a method, further including shutting down the first server when no user devices are connected to the first virtual cell.

In some aspects, the techniques described herein relate to a method, further including initializing the second virtual cell via the radio unit on the second server in response to determining to reduce the load on the first server.

In some aspects, the techniques described herein relate to a method, wherein the first virtual cell and the second virtual cell have a same carrier frequency and are assigned different frequency domain resources.

In some aspects, the techniques described herein relate to a method, wherein the first virtual cell and the second virtual cell are configured with a same transmission power.

In some aspects, the techniques described herein relate to a method, wherein the first server is configured to host a first central unit, further including handing over one or more user devices to a third virtual cell provided by a third DU on the first server and supported by a second central unit on the second server.

In some aspects, the techniques described herein relate to a non-transitory computer-readable medium storing computer-executable instructions that when executed by a processor cause the processor to: determine to reduce a load on a first server hosting a first mobile network distributed unit (DU) for providing a first virtual cell to a plurality of user devices via a radio unit; identify a second server hosting a second mobile network DU providing a second virtual cell via the radio unit; and hand over the plurality of user devices from the first virtual cell to the second virtual cell. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
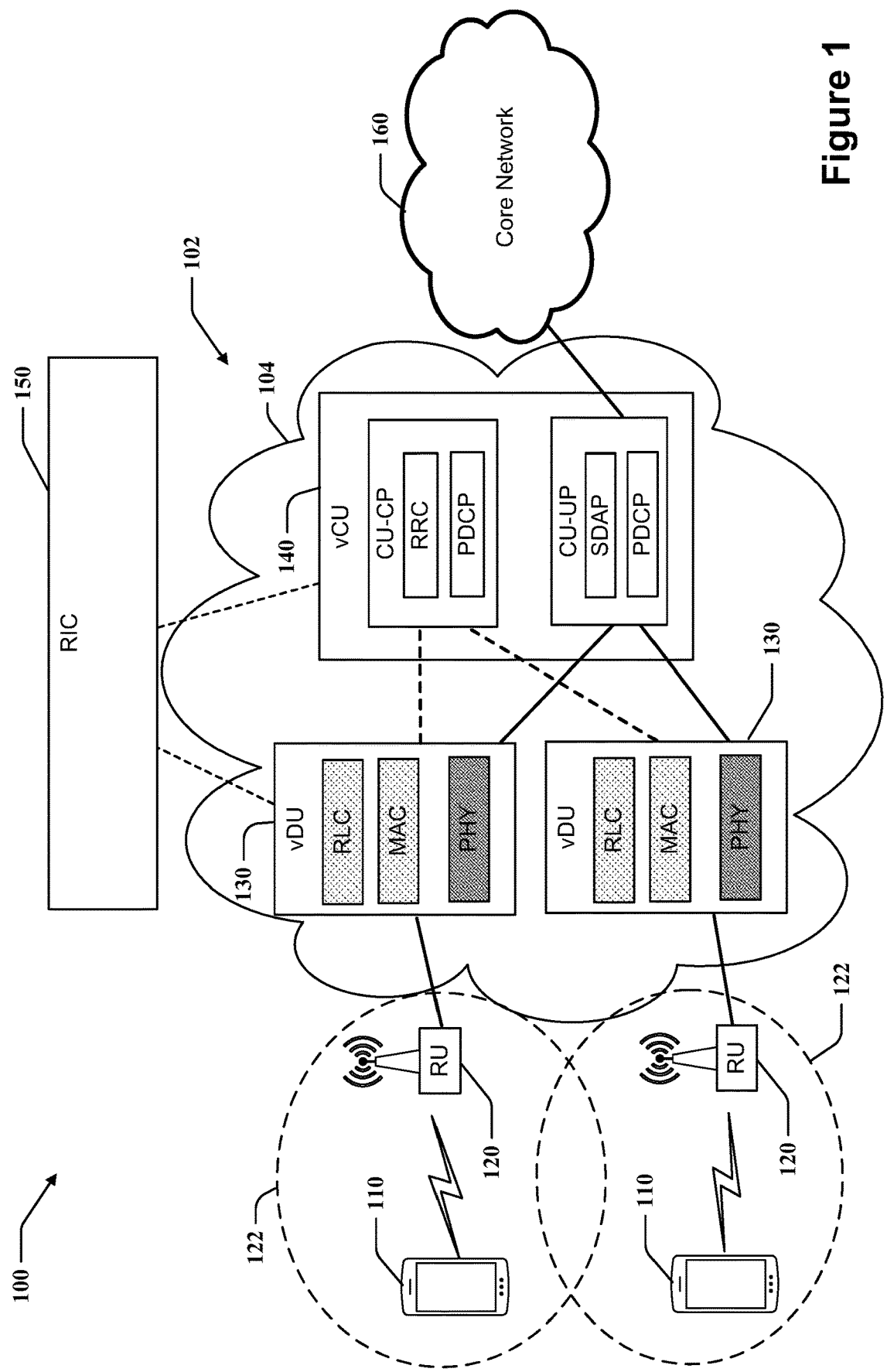
FIG. 1 is a diagram of an example mobile network including a radio access network (RAN) that connects a user equipment (UE) to a core network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to repurposing mobility management with virtual radio in software radio access networks. In a software radio access network (also referred to as a virtual RAN or vRAN), various base station components such as a central unit (CU) and distributed unit (DU) may be implemented in software executing on generic computing resources and may be referred to as a virtual central unit (vCU) and virtual distributed unit (vDU), respectively. For example, in a cloud network implementation, vRAN components may be executed as workloads on servers or datacenters. A key transformation of the Radio Access Network (RAN) in 5G is the migration to an Open RAN architecture, that sees the 5G RAN virtualized and disaggregated across multiple open interfaces. This approach fosters innovation by allowing multiple vendors to come up with unique solutions for different components at a faster pace. Furthermore, a new component introduced in the Open RAN architecture called a Radio Intelligent Controller (RIC) allows third parties to build new, vendor-agnostic monitoring and optimization use cases over interfaces standardized by O-RAN.

Generally, in cloud computing, workloads may be migrated between computing resources for network management such as load balancing, maintenance, and updates. In a vRAN, migration of vRAN components may be complicated by ongoing connections with user devices. A connection with a user device may be a stateful session that includes state information at multiple vRAN components such as a vCU and a vDU. For example, a network operator may not want to degrade quality of a connection with a user device when migrating a vRAN component. Accordingly, it may be desirable to migrate a vCU or a vDU while leaving the user devices connected to the same radio unit (RU) to maintain signal quality.

In some ways, the disaggregated O-RAN architecture for base stations may complicate migration among computing resources. For example, because O-RAN allows multiple split architectures between the DU and CU, different vendors may include functionality at different locations. Such flexibility may make state transfer difficult as solutions may be vendor and architecture specific.

In an aspect, the present application provides for stateful migration of vRAN components by repurposing mobility management using virtual cells. A virtual cell may refer to a cell implemented at a RU that shares the RU with another virtual cell and is supported by a different vDU. Each virtual cell at an RU may have a unique physical cell identifier although the virtual cells share the same physical RU. Accordingly, the virtual cells at an RU may have the same radio properties including center frequency. To avoid interference, the RIC may allocate frequency domain resources among the virtual cells.

The virtual cells may allow RAN mobility management procedures such as handovers to be used for migrating user devices or user equipment (UEs) between vDUs or vCUs. For example, a UE may be handed over from a first virtual cell provided by a first DU to a second virtual cell provided by a second DU without changing the physical RU. Accordingly, the radio properties of the UE may not change during the handover. The handover, however, provides for transfer of state information using defined interfaces between the virtual cells. Accordingly, the state information may be transferred between vDUs using standardized interfaces without a need for vendor specific or other custom interfaces between the computing resources (e.g., servers or datacenters). Accordingly, the RAN mobility management may be used for performing network management such as load balancing, maintenance, and updates without degrading connections with user devices.

In an aspect, using a handover between virtual cells that share a physical radio unit allows transfer of state information between two servers using standardized interfaces for interoperability. The ability to transfer state information improves network performance and efficiency by, for example, balancing workloads between computing resources. Additionally, in some cases, overprovisioned resources may be temporarily shut down to conserve power by migrating all connected user devices to a different vRAN component while still maintaining network coverage via the RU that provides the best connection for the user devices. For example, the overprovisioned resources performing processing for a small number of user devices may consume similar amounts of electricity as resources running closer to capacity. Accordingly, by transferring workloads to a smaller number of resources (e.g., servers) and shutting down other vRAN components, the system may consume less electricity.

Figure 4:
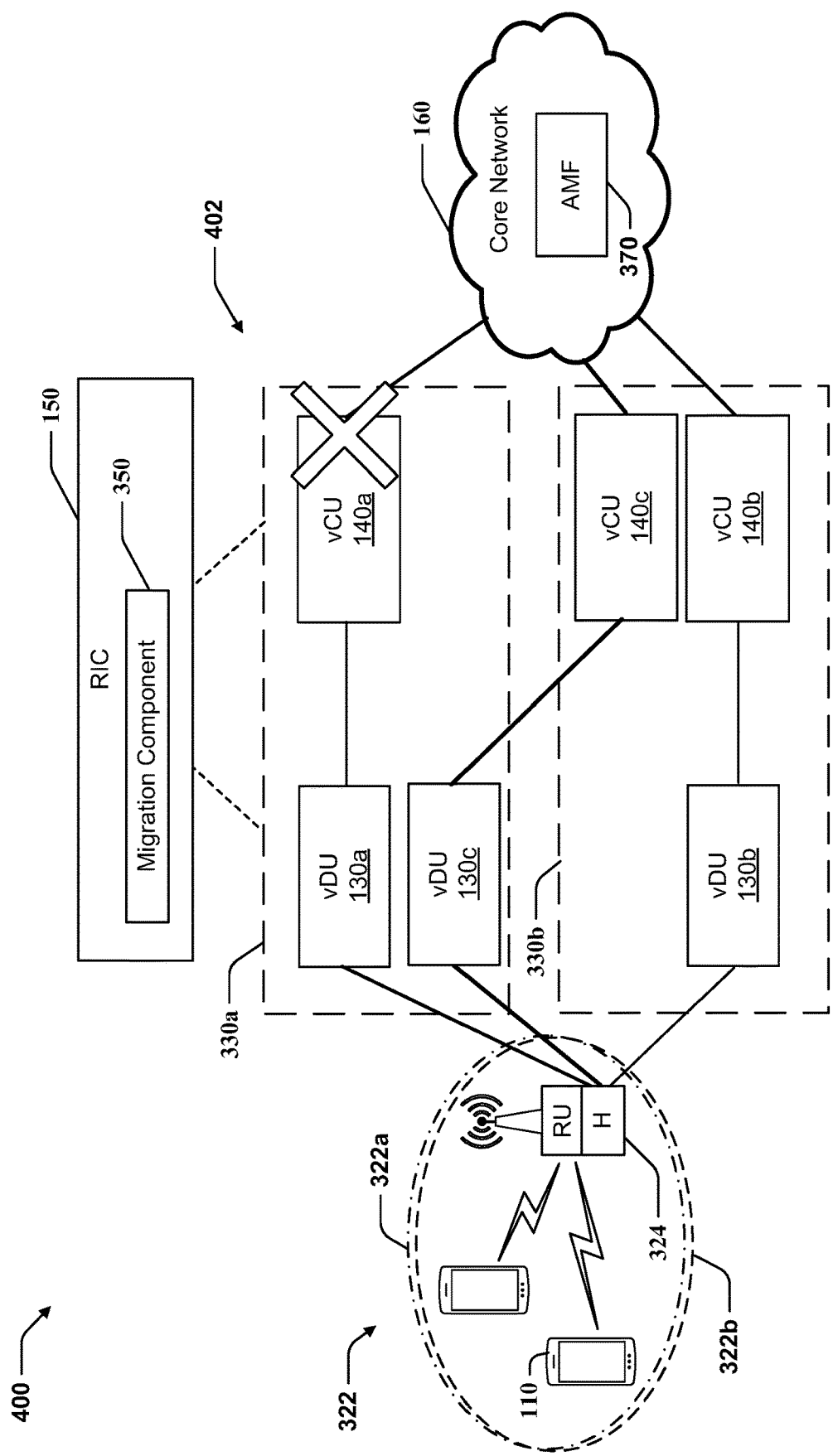
FIG. 4 is a diagram of an example vRAN allowing migration of load from a virtual central unit (vCU) via virtual cells.
Figure 5:
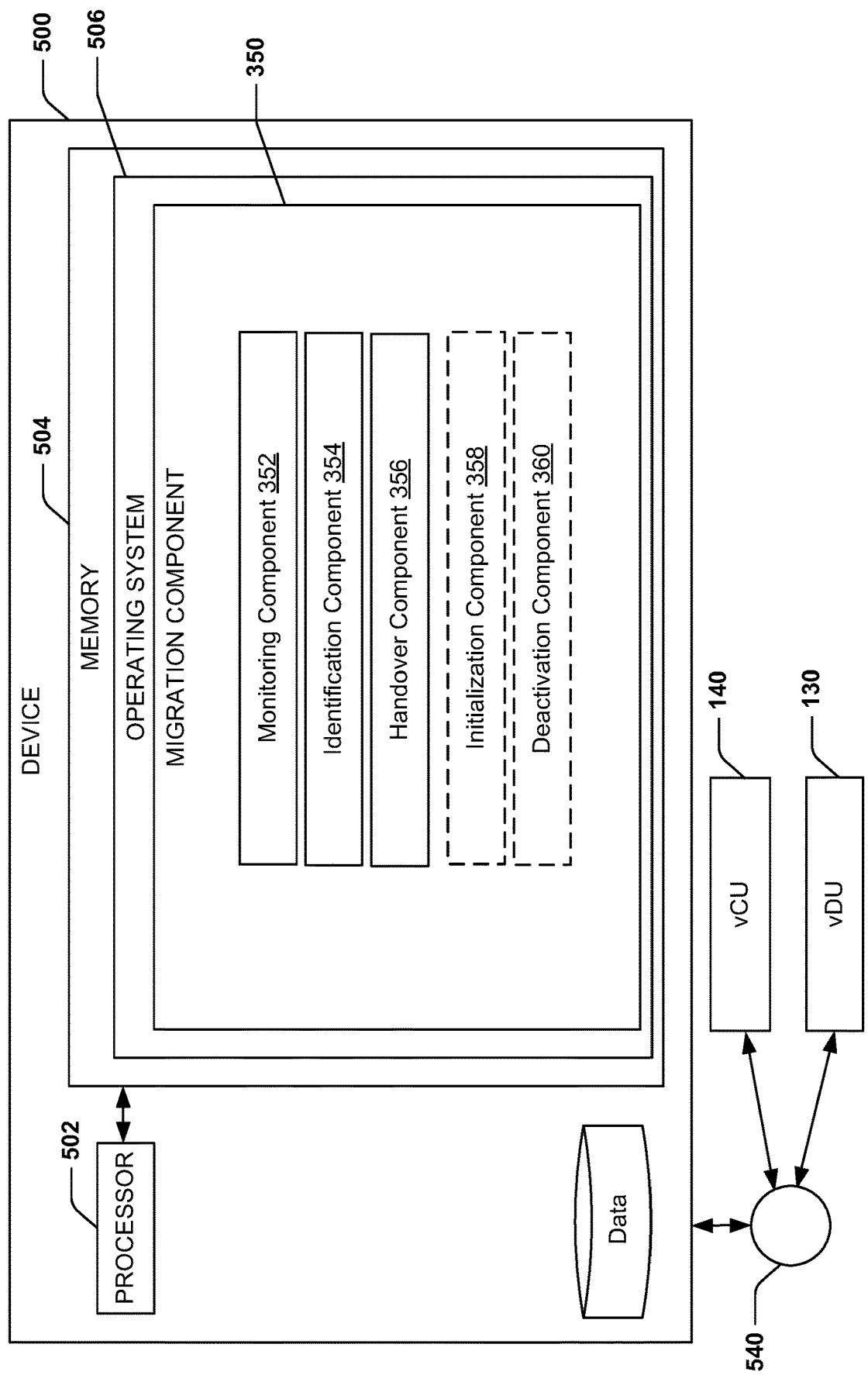
FIG. 5 is a schematic diagram of an example of an apparatus for implementing a RAN intelligent controller (RIC) including a migration component.
Figure 6:
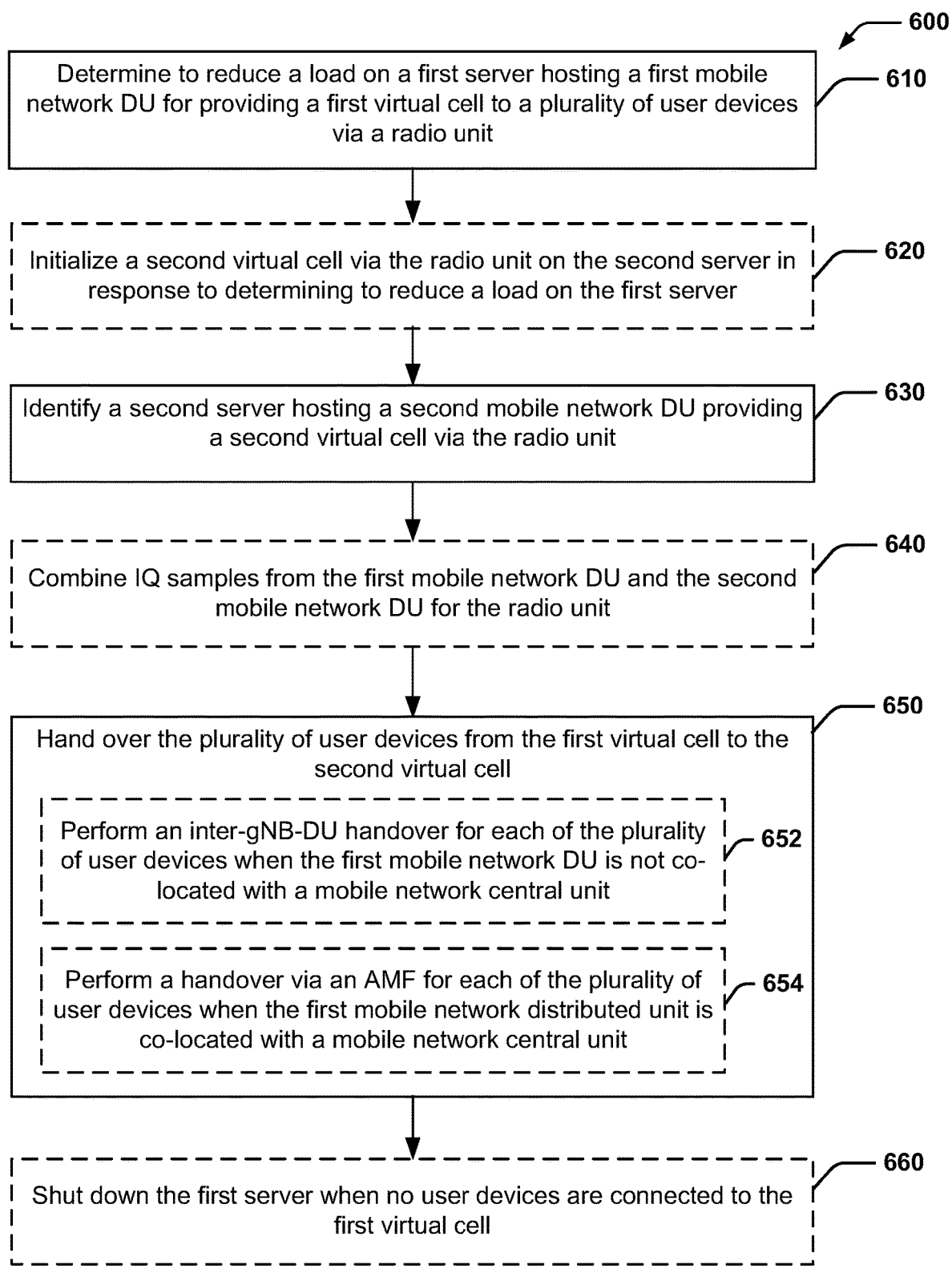
FIG. 6 is a flow diagram of an example of a method for migrating user devices among vRAN components or servers using virtual cells.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and a software component capable of performing the described actions or functions.

FIG. 1 is a diagram of an example mobile network 100 including a radio access network (RAN) 102 that connects a user device or user equipment (UE) 110 to a core network 160. The RAN may be implemented, at least in part, as a virtualized radio access network (vRAN). The vRAN 102 may include radio units (RUs) 120 that transmit and receive wireless signals with the UE 110. Each RU 120 may provide a cell 122 having a coverage area that may overlap with other cells. Each RU 120 may include one or more antennas for transmitting and receiving radio frequency (RF) signals with the UEs 110 within the cell 122. Accordingly, an RU 120 may include a physical antenna and may be referred to as a physical RU because an RU 120 cannot be completely virtualized.

The vRAN 102 may include virtual network components, which may be implemented on generic computing resources such as in a cloud network 104. The cloud network 104 may include an underlying wide area network (WAN) having computing resources such as servers or datacenters that may be used to instantiate software network functions. For example, the vRAN 102 may include one or more virtual distributed units (vDUs) 130 that perform processing for a cell 122, for example, at the physical (PHY) layer, media access control (MAC) layer, and radio link control (RLC) layer. The vRAN 102 may include one or more virtual central units (vCUs) 140 that perform processing at higher layers of the wireless protocol stack. In an example architecture, the vCU 140 may be divided into a central unit control plane (CU-CP) and central unit user plane (CU-UP). CU-UP may include the packet data convergence protocol (PDCP) layer and the service data adaptation (SDAP) layer, and the radio resource control (RRC) layer.

The division of functionality or protocol layers between the vDU 130 and the vCU 140 may depend on a functional split architecture. For example, as illustrated, the functional split may be between the RLC layer and the PDCP layer and may be referred to as option 2. Other options may include a functional split between the RRC layer and PDCP layer (option1) or between or within the layers illustrated at the vDU 130. Accordingly, a vRAN 102 may allow network equipment vendors to offer network operators greater flexibility in where to locate computing resources for various protocol layers.

The vRAN 102 may include a RAN intelligent control (RIC) 150 that performs autonomous configuration and optimization of the vRAN 102. In some implementations, the RIC 150 may allocate resources of the cloud network 104 for instantiating vRAN components such as vDU 130 and vCU 140. For example, the RIC 150 may provide a configuration file for each vDU 130 or vCU 140. The RIC 150 may assign network resources such as frequency subbands to cells. Further, the RIC may monitor performance of the vRAN 102 and adapt the configuration. For example, the RIC 150 may receive monitoring information such as performance metrics from the vRAN components such as the vDU 130 and vCU 140.

Figure 2:
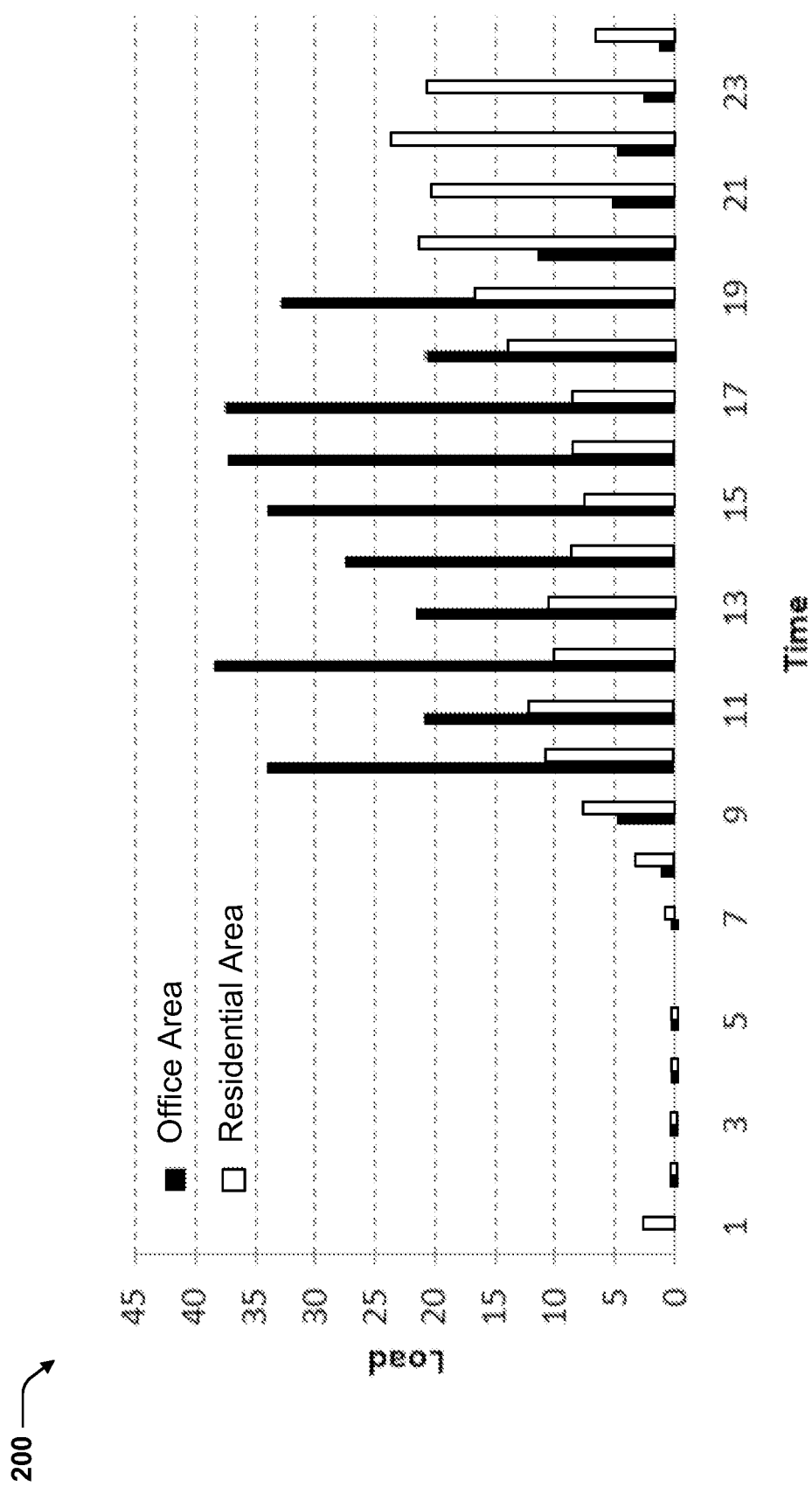
FIG. 2 is a chart showing an example of mobile network load over time in an office area and a residential area.

FIG. 2 is a chart 200 showing an example of mobile network load over time in an office area and a residential area. Mobile network load may exhibit a tidal effect as people move between the office area and the residential area. For example, the load in the office area is greatest during working hours and early evening (e.g., 9-19), while the residential area experiences steady load during working hours and an increase at late evening into night (e.g., 19-24).

In a conventional RAN, resources such as base stations are provisioned to handle peak loads. Such deployments often leave resources idle. A vRAN may implement base station functionality on generic computing resources while still using physical RUs. While vRAN has the potential to shift resources, current vRAN deployments lack efficient techniques for migrating base station components (e.g., vDU 130 and/or vCU 140) among network resource such as servers or datacenters. For example, a vDU 130 and/or vCU 140 may support a cell 122 with one or more UEs 110 that that remain connected although the load is low. The connection with the UE may be stateful and a migration may drop a connection with the UE. Alternatively, state information may be transferred to another server to maintain the cell 122. Transfer of state information, however, may be vendor or deployment specific. For instance, the flexibility of the functional split architecture may require transfer of different state information to different locations for each split option.

Figure 3:
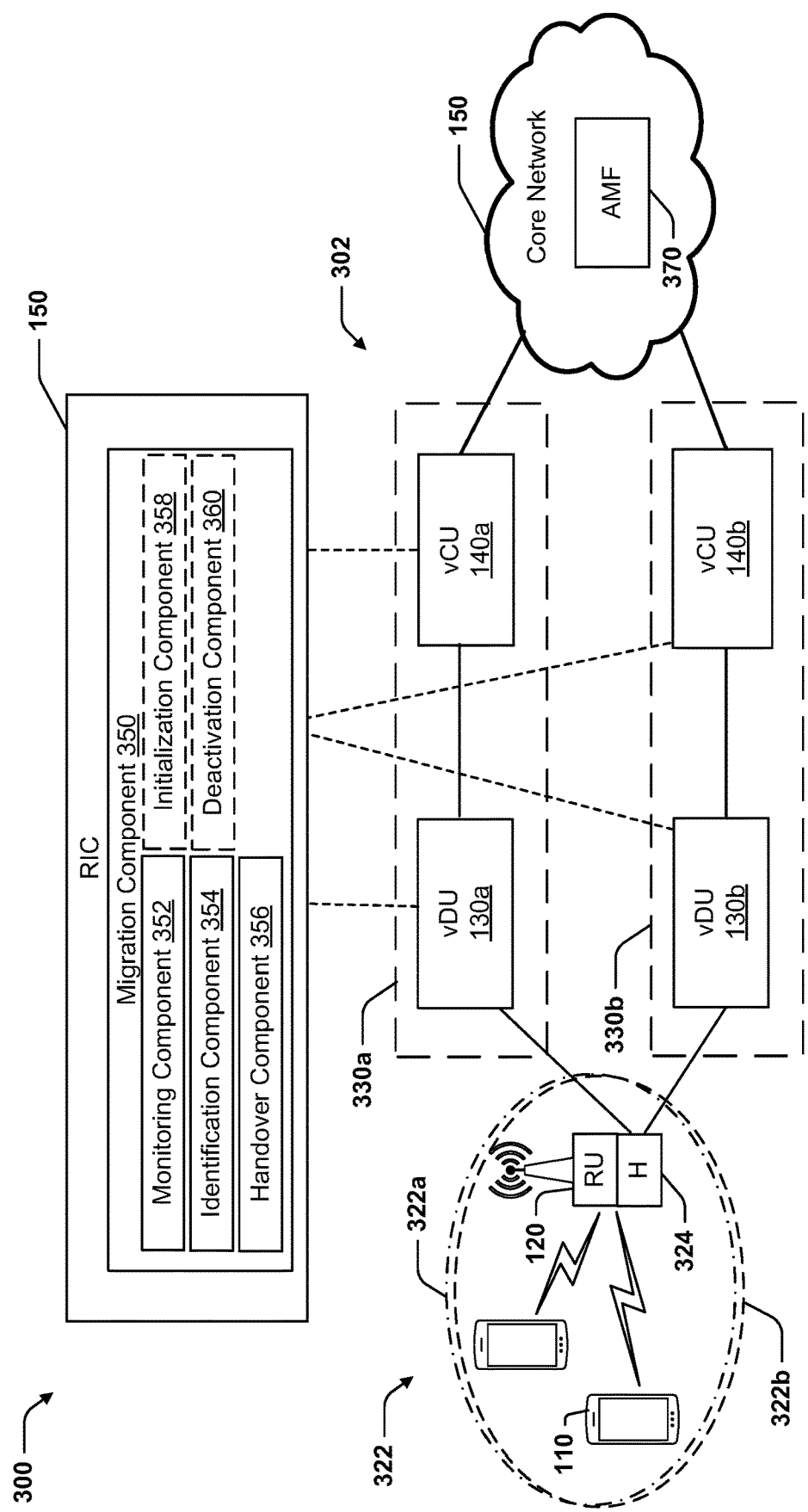
FIG. 3 is a diagram of an example virtualized RAN (vRAN) 302 providing virtual cells supported by at least two virtual distributed units (vDUs) on a single radio unit (RU).

FIG. 3 is a diagram 300 of an example vRAN 302 providing virtual cells 322 supported by at least two vDUs 130 on a single RU 120. For example, a first server 330*a* may include a first vDU 130*a* and a first vCU 140*a* configured to perform processing for a first virtual cell 322*a* using the RU 120. A second server 330*b* may include a second vDU 130*b* and a second vCU 140*b* configured to perform processing for a second virtual cell 322*b* using the RU 120. Because the virtual cells 322 utilize the same RU 120, the coverage area and radio properties of the virtual cells 322 may be the same. For example, the virtual cells 322 may be configured with the same transmission power. The RIC 150 may allocate frequency resources between the virtual cells 322 to prevent conflicts. For example, the RIC 150 may allocate different sets of resource blocks (RBs) to each cell even through the cells may share a common center frequency.

The vRAN 302 may include a hypervisor (H) 324 configured to combine and/or separate in phase and quadrature (IQ) samples for the RU 120. The hypervisor 324 may be located between vDUs 130 and RU 120. For example, the hypervisor 324 can be implemented at the RU 120, in a switch connecting vDUs 130 to RU 120, or in another server residing in the edge. In the downlink, the hypervisor 324 may combine IQ samples from the vDU 130*a* and the VDU 130*b* for conversion to RF and transmission via the RU 120. In the uplink, the hypervisor 324 may separate IQ samples from the RU 120 to separately send to the vDU 130*a* and the vDU 130*b*.

The virtual cells 322 may allow migration of UEs 110 between servers 330*a* using standardized RAN handover techniques to transfer state information. For example, as load in an area decreases, the server 330*a* may have a few remaining UEs 110 connected. If the server 330*a* were able to migrate those UEs 110 to the server 330*b*, the server 330*a* may be shut down to save costs such as power. As another example, if server 330*a* is performing processing for too many UEs 110 and server 330*b* has available capacity, it may be desirable to balance the loads by migrating some UEs 110 from server 330*a* to server 330*b*. Further, it may be desirable to shut down a network component or server 330*a* for maintenance or updating. By migrating the UEs 110 to another network component or server, the maintenance or update may be performed without dropping service to the connected user devices.

In an aspect, the RIC 150 may include a migration component 350 configured to migrate UEs between servers using virtual cells 322. The migration component 350 may include a monitoring component 352 configured to determine to reduce a load on a first server 330*a* hosting a first mobile network distributed unit (DU) (e.g., vDU 130*a*) for providing a first virtual cell 322 to a plurality of user devices (e.g., UEs 110) via a radio unit 120. The migration component 350 may include an identification component 354 configured to identify a second server 330*b* hosting a second mobile network DU (e.g., vDU 130*b*) providing a second virtual cell 322 via the RU 120. The migration component 350 may include a handover component 356 configured to hand over the plurality of user devices from the first virtual cell to the second virtual cell. The migration component 350 may optionally include an initialization component 358 configured to initialize the second virtual cell via the radio unit on the second server in response to determining to reduce a load on a first server. For example, the initialization component 358 may initialize the second virtual cell prior to controlling the first DU to hand over the plurality of user devices. The migration component 350 may optionally include a deactivation component 360 configured to shut down the first server when no user devices are connected to the first virtual cell.

The handover between the first virtual cell and the second virtual cell may use various handover procedures depending on a relationship between the first DU and the second DU. The handover may be a network initiated handover that does not rely on UE measurements to select target cell. For example, if the first DU and the second DU are connected to the same vCU 140 as in FIG. 1, the migration component 350 or handover component 356 may control the first DU to perform an inter-DU handover. If the first DU and the second DU are connected to different vCUs 140, the migration component 350 or handover component 356 may control the first DU to perform a handover via an Access and Mobility Management Function (AMF) 370 located in the core network 160. Additionally, when the vDU 130*a* is co-located with the vCU 140*a* at the server 330*a* and the goal is to shut down the server 330*a*, the migration component 350 or handover component 356 may control the first DU to perform a handover via the AMF 370.

FIG. 4 is a diagram 400 of an example vRAN 402 allowing migration of load from a vCU 140*a* via virtual cells. The vRAN 402 may be similar to the vRAN 302 with the addition of a third vDU 130*c* and a third vCU 140*c*. The vDU 130*c* may be co-located with the vDU 130*a*. The vCU 140*c* may be on a different server than the vCU 140*a*. To migrate load of the vCU 140*a* to the server 330*b*, the migration component 350 may control the vDU 130*a* to handover UEs 110 to either the vDU 130*b* or the vDU 130*c*. Handing over UEs to the vDU 130*c* may allow the vCU 140*a* to be shut down while keeping vDU processing at the server 330*a*. Handing over UEs to the vDU 130*b* would also migrate the vDU processing to the server 330*b*.

FIG. 5 is a schematic diagram of an example of an apparatus 500 (e.g., a computing device) for implementing a RIC 150 including a migration component 350. The apparatus 500 may be an example of a RIC 150. The apparatus 500 may reside within a data center, which may be an edge data center. The apparatus 500 may be connected to other servers within the data center or at other data centers via the switch 540. For example, apparatus 500 may be connected to a vCU 140 and vDU 130.

In an example, apparatus 500 can include a processor 502 and/or memory 504 configured to execute or store instructions or other parameters related to providing an operating system 506, which can execute one or more applications or processes, such as, but not limited to, the migration component 350. For example, processor 502 and memory 504 may be separate components communicatively coupled by a bus (e.g., on a motherboard or other portion of a computing device, on an integrated circuit, such as a system on a chip (SoC), etc.), components integrated within one another (e.g., processor 502 can include the memory 504 as an on-board component), and/or the like. Memory 504 may store instructions, parameters, data structures, etc. for use/execution by processor 502 to perform functions described herein.

In an example, the migration component 350 may include one or more of the monitoring component 352, the identification component 354, the handover component 356, the initialization component 358 or the deactivation component 360.

FIG. 6 is a flow diagram of an example of a method 600 for migrating user devices among vRAN components or servers using virtual cells. For example, the method 600 can be performed by an apparatus 500 and/or one or more components thereof to migrate processing for UEs from a first server to a second server. Some optional blocks of the method 600 may be performed by other network components under control of the apparatus 500.

At block 610, the method 600 includes determining to reduce a load on a first server hosting a first mobile network DU for providing a first virtual cell to a plurality of user devices via a radio unit. In an example, the monitoring component 352, e.g., in conjunction with processor 502, memory 504, and operating system 506, can determine to reduce a load on a first server 330a hosting a first mobile network DU (e.g., vDU 130a) for providing a first virtual cell 322a to a plurality of user devices 110 via a radio unit 120. For example, the monitoring component 352 may be configured to detect one or more conditions. For instance, a condition for load balancing may be that a load on server resources that is greater than an upper threshold. As another example, a condition for migrating all of the load may be a remaining load being less than a lower threshold and an available alternative server, in which case the server may be shut down. As another example, a condition may include an update scheduled for the server or a vRAN component hosted on the server.

At block 620, the method 600 may optionally include initializing a second virtual cell via the radio unit on the second server in response to determining to reduce the load on the first server. In an example, the initialization component 358, e.g., in conjunction with processor 502, memory 504, and operating system 506, can initialize a second virtual cell 322b via the radio unit 120 on the second server 330b in response to determining to reduce the load on the first server. For example, the vDU 130b may not be providing a virtual cell 322 via the RU 120 (e.g., because of maintenance). In some implementations, the initialization component 358 may dynamically provision the vDU 130b to provide a virtual cell 322b via the RU 120. In some implementations, the initialization component 358 may instantiate the vDU 130b and/or the vCU 140b on the second server 330b and provide a cell configuration to the vDU 130b and/or vDU 140b. Instantiating the vDU 130b and/or the vCU may include establishing interfaces with other vRAN components. For example, a vDU may communicate with the vCU via an F1 interface and vCUs may communicate via E1 interfaces.

At block 630, the method 600 includes identifying a second server hosting a second mobile network DU providing a second virtual cell via the radio unit. In an example, the identification component 354, e.g., in conjunction with processor 502, memory 504, and operating system 506, can identify a second server 330b hosting a second mobile network DU (e.g., vDU 130b) providing a second virtual cell 322b via the radio unit 120. For example, the identification component 354 may identify a vDU 130 connected to the same RU 120.

At block 640, the method 600 may optionally include combining IQ samples from the first mobile network DU and the second mobile network DU for the radio unit. In an example, the hypervisor 324 can combine IQ samples from the first mobile network DU 130a and the second mobile network DU 130b for the radio unit 120.

At block 650, the method 600 includes handing over the plurality of user devices from the first virtual cell to the second virtual cell. In an example, the handover component 356, e.g., in conjunction with processor 502, memory 504, and operating system 506, can hand over the plurality of user devices 110 from the first virtual cell 322a to the second virtual cell 322b. For example, the handover component 356 at the RIC 150 can control the vDU 130a to perform a handover. In some implementations, at sub-block 652, the block 650 may optionally include performing an inter-gNB-DU handover for each of the plurality of user devices 110 when the first mobile network DU 130a is not co-located with a mobile network central unit (e.g., vCU 140a). That is, if the vCU 140a is not at the same first server 330a, the UEs 110 may be handed over to another vDU connected to the vCU 140a. For instance, the inter-gNB-DU handover may include the vCU 140 sending a UE CONTEXT SETUP REQUEST message to the target vDU to create a UE context. The target vDU may reply with a UE CONTEXT SETUP RESPONSE message. The vCU 140 may modify bearers and send a UE CONTEXT MODIFICATION REQUEST message to the source vDU. The vDU may send a handover command to the UE 110. The UE may perform a random access procedure and send a RRC reconfiguration complete message after connecting. The target vDU may send a UL RRC MESSAGE TRANSFER message to the vCU. The vCU may send a UE CONTEXT RELEASE COMMAND to the vDU, which may acknowledge with a UE CONTEXT RELEASE COMPLETE message.

In some implementations, at sub-block 654, the block 650 may optionally include performing a handover via the AMF 370 for each of the plurality of user devices when the first mobile network distributed unit is co-located with a mobile network central unit (e.g., vCU 140a). That is, if the vDU 130a and vCU 140a are on the same server 330a, the UEs 110 may be handed over to a different vCU 140b so that the server 330a can be shut down.

At block 660, the method 600 may optionally include shutting down the first server when no user devices are connected to the first virtual cell. In an example, the deactivation component 360, e.g., in conjunction with processor 502, memory 504, and operating system 506, can shut down the first server 330a when no user devices are connected to the first virtual cell 322a.

Figure 7:
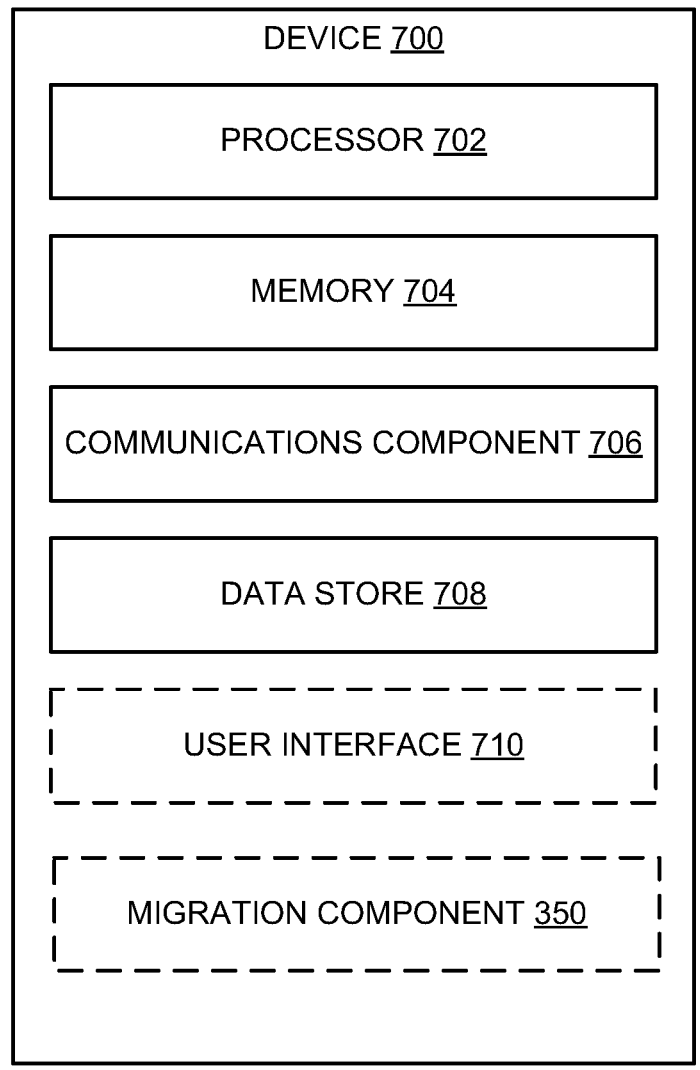
FIG. 7 illustrates an example of a device including additional optional component details as those shown in FIG. 5.

FIG. 7 illustrates an example of a device 700 including additional optional component details as those shown in FIG. 5. In one aspect, device 700 may include processor 702, which may be similar to processor 502 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 may further include memory 704, which may be similar to memory 504 such as for storing local versions of operating systems (or components thereof) and/or applications being executed by processor 702, such as migration component 350, etc. Memory 704 can include a type of memory usable by a computer, such as random access memory (RAM), read only memory (ROM), tapes, magnetic discs, optical discs, volatile memory, non-volatile memory, and any combination thereof.

Further, device 700 may include a communications component 706 that provides for establishing and maintaining communications with one or more other devices, parties, entities, etc. utilizing hardware, software, and services as described herein. Communications component 706 may carry communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for migration component 350, and/or one or more other components of the device 700.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 may additionally include the migration component 350 for migrating RAN processing to a second server via a handover to a second virtual cell, as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. Non-transitory computer-readable media specifically excludes transitory signals. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the claim language. Reference to an element in the singular is not intended to mean "one and only one" unless specifically so stated, but rather "one or more." Unless specifically stated otherwise, the term "some" refers to one or more. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A virtual mobile network comprising:
   a radio unit;
   a first server configured to host a first mobile network distributed unit (DU) for providing a first virtual cell to a plurality of user devices via the radio unit;
   a second server configured to host a second mobile network distributed unit providing a second virtual cell via the radio unit; and
   a radio access network (RAN) intelligent controller (RIC) configured to control the first DU and the second DU to hand over the plurality of user devices from the first virtual cell to the second virtual cell, wherein the first virtual cell and the second virtual cell have a same center frequency and are assigned different frequency domain resources.

2. The virtual mobile network of claim 1, wherein the RIC is configured to control the first DU and the second DU to perform an inter-gNB-DU handover for each of the plurality of user devices when the first mobile network DU is not co-located with a mobile network central unit.

3. The virtual mobile network of claim 1, wherein the RIC is configured to control the first DU and the second DU to perform a handover via an Access and Mobility Management Function (AMF) for each of the plurality of user devices when the first mobile network DU is co-located with a mobile network central unit (CU).

4. The virtual mobile network of claim 1, further comprising a hypervisor configured to combine in-phase and quadrature (IQ) samples from the first mobile network DU and the second mobile network DU for the radio unit.

5. The virtual mobile network of claim 1, wherein the RIC is configured to shut down the first server when no user devices are connected to the first virtual cell.

6. The virtual mobile network of claim 1, wherein the RIC is configured to initialize the second virtual cell on the second server prior to controlling the first DU and the second DU to hand over the plurality of user devices.

7. The virtual mobile network of claim 1, wherein the first virtual cell and the second virtual cell are configured with a same transmission power.

8. The virtual mobile network of claim 1, wherein the RIC is configured to control the first DU and the second DU to hand over the plurality of user devices based on load balancing between the first server and the second server.

9. The virtual mobile network of claim 1, wherein the first server is configured to host a first central unit, wherein the RIC is configured to control the first DU to hand over one or more of the user devices to a third virtual cell provided by a third DU on the first server and supported by a second central unit on the second server.

10. A method, comprising:
   determining to reduce a load on a first server hosting a first mobile network distributed unit (DU) for providing a first virtual cell to a plurality of user devices via a radio unit;
   identifying a second server hosting a second mobile network DU providing a second virtual cell via the radio unit; and
   handing over the plurality of user devices from the first virtual cell to the second virtual cell, wherein the first virtual cell and the second virtual cell have a same center frequency and are assigned different frequency domain resources.

11. The method of claim 10, wherein handing over the plurality of user devices comprises performing an inter-gNB-DU handover for each of the plurality of user devices when the first mobile network DU is not co-located with a mobile network central unit.

12. The method of claim 10, wherein handing over the plurality of user devices comprises performing a handover via an Access and Mobility Management Function (AMF) for each of the plurality of user devices when the first mobile network distributed unit is co-located with a mobile network central unit.

13. The method of claim 10, further comprising combining in-phase and quadrature (IQ) samples from the first mobile network DU and the second mobile network DU for the radio unit.

14. The method of claim 10, further comprising shutting down the first server when no user devices are connected to the first virtual cell.

15. The method of claim 10, further comprising initializing the second virtual cell via the radio unit on the second server in response to determining to reduce the load on the first server.

16. The method of claim 10, wherein the first virtual cell and the second virtual cell are configured with a same transmission power.

17. The method of claim 10, wherein the first server is configured to host a first central unit, further comprising handing over one or more user devices to a third virtual cell provided by a third DU on the first server and supported by a second central unit on the second server.

18. A non-transitory computer-readable medium storing computer-executable instructions that when executed by a processor cause the processor to:
   determine to reduce a load on a first server hosting a first mobile network distributed unit (DU) for providing a first virtual cell to a plurality of user devices via a radio unit;
   identify a second server hosting a second mobile network DU providing a second virtual cell via the radio unit; and
   hand over the plurality of user devices from the first virtual cell to the second virtual cell, wherein the first virtual cell and the second virtual cell have a same center frequency and are assigned different frequency domain resources.

* * * * *